(12) United States Patent
Seiler

(10) Patent No.: US 12,359,831 B2
(45) Date of Patent: Jul. 15, 2025

(54) SYSTEMS AND METHODS FOR PROVIDING CUSTOM APPLICATIONS FOR HVAC SYSTEMS

(71) Applicant: Johnson Controls Technology Company, Auburn Hills, MI (US)

(72) Inventor: Aron M. Seiler, White Hall, MD (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 340 days.

(21) Appl. No.: 17/164,669

(22) Filed: Feb. 1, 2021

(65) Prior Publication Data

US 2021/0156586 A1 May 27, 2021

Related U.S. Application Data

(63) Continuation of application No. 15/653,332, filed on Jul. 18, 2017, now Pat. No. 10,907,853.

(60) Provisional application No. 62/421,062, filed on Nov. 11, 2016.

(51) Int. Cl.
| | |
|---|---|
| F24F 11/62 | (2018.01) |
| F24F 11/30 | (2018.01) |
| F24F 11/52 | (2018.01) |
| F24F 11/63 | (2018.01) |
| F24F 110/10 | (2018.01) |
| F24F 110/40 | (2018.01) |
| G05B 15/02 | (2006.01) |
| G05B 17/02 | (2006.01) |

(52) U.S. Cl.
CPC .............. *F24F 11/62* (2018.01); *F24F 11/30* (2018.01); *G05B 15/02* (2013.01); *G05B 17/02* (2013.01); *F24F 11/52* (2018.01); *F24F 11/63* (2018.01); *F24F 2110/10* (2018.01); *F24F 2110/40* (2018.01); *G05B 2219/2642* (2013.01)

(58) Field of Classification Search
CPC .. F24F 11/62; F24F 11/30; F24F 11/52; F24F 11/63; F24F 2110/10; F24F 2110/40; G05B 15/02; G05B 17/02; G05B 2219/2642
See application file for complete search history.

(56) References Cited

U.S. PATENT DOCUMENTS

| | | |
|---|---|---|
| 6,955,302 B2 | 10/2005 | Erdman, Jr. |
| 7,209,870 B2 | 4/2007 | Simmons et al. |
| 8,000,832 B1 | 8/2011 | Schmidtke et al. |
| 8,650,306 B2 | 2/2014 | Pouchak |
| 8,725,299 B2 | 5/2014 | Hess et al. |
| 8,779,698 B2 | 7/2014 | Havard et al. |

(Continued)

FOREIGN PATENT DOCUMENTS

WO     2001073651     10/2001

*Primary Examiner* — Ziaul Karim
(74) *Attorney, Agent, or Firm* — Fletcher Yoder, P.C.

(57) ABSTRACT

A heating, ventilating, and air conditioning (HVAC) system is provided. The HVAC system includes a non-transitory computer readable medium that includes instructions that are configured to cause a processor to generate a custom application for an HVAC unit in response to an inquiry regarding the HVAC unit. The custom application comprises a custom sequence of equipment operation of the HVAC unit, and the custom application is configured to regulate operation of components of the HVAC unit. Moreover, the custom application comprises operating parameters and control parameters associated with the HVAC unit.

20 Claims, 8 Drawing Sheets

(56) References Cited

U.S. PATENT DOCUMENTS

| | | | |
|---|---|---|---|
| 9,063,739 B2 | 6/2015 | Ward et al. | |
| 9,311,432 B1 | 4/2016 | Schmidtke et al. | |
| 9,322,567 B2 | 4/2016 | Sikora et al. | |
| 9,519,731 B2 | 12/2016 | Strelec et al. | |
| 9,599,359 B2 | 3/2017 | Kowald et al. | |
| 2004/0138981 A1* | 7/2004 | Ehlers | F24F 11/58 705/36 R |
| 2004/0143810 A1 | 7/2004 | Ahmed et al. | |
| 2004/0260431 A1* | 12/2004 | Keenan, Jr. | H04L 9/40 700/297 |
| 2005/0116023 A1 | 6/2005 | Amundson et al. | |
| 2007/0043478 A1 | 2/2007 | Ehlers et al. | |
| 2007/0191988 A1* | 8/2007 | Aronstam | G05D 23/1905 700/276 |
| 2007/0293208 A1 | 12/2007 | Loh et al. | |
| 2009/0057428 A1 | 3/2009 | Geadelmann et al. | |
| 2009/0088902 A1 | 4/2009 | Williams | |
| 2011/0166712 A1 | 7/2011 | Kramer et al. | |
| 2012/0010739 A1 | 1/2012 | Elisma | |
| 2012/0064923 A1 | 3/2012 | Imes et al. | |
| 2012/0072181 A1 | 3/2012 | Imani | |
| 2013/0018850 A1 | 1/2013 | Houlihan et al. | |
| 2015/0053779 A1* | 2/2015 | Adamek | F24F 11/30 236/1 C |
| 2015/0144706 A1* | 5/2015 | Robideau | F24F 11/30 236/94 |
| 2015/0253027 A1 | 9/2015 | Lu et al. | |
| 2015/0276508 A1 | 10/2015 | Smullin | |
| 2016/0201933 A1 | 7/2016 | Hester et al. | |
| 2016/0234186 A1 | 8/2016 | Leblond et al. | |
| 2017/0005818 A1* | 1/2017 | Gould | G05B 15/02 |
| 2017/0005982 A1* | 1/2017 | Gould | G06Q 50/01 |
| 2017/0053441 A1 | 2/2017 | Nadumane et al. | |
| 2017/0177766 A1 | 6/2017 | Song et al. | |
| 2017/0314799 A1 | 11/2017 | LeRoy et al. | |
| 2019/0173685 A1* | 6/2019 | Gould | H04L 12/2827 |

* cited by examiner

SYSTEMS AND METHODS FOR PROVIDING CUSTOM APPLICATIONS FOR HVAC SYSTEMS

CROSS REFERENCE TO RELATED APPLICATIONS

This application is a continuation of U.S. patent application Ser. No. 15/653,332, filed Jul. 18, 2017, entitled "SYSTEMS AND METHODS FOR PROVIDING CUSTOM APPLICATIONS FOR HVAC SYSTEMS," which claims priority from and the benefit of U.S. Provisional Application Ser. No. 62/421,062, entitled "CUSTOMIZATION METHOD AND PROCESS FLOW FOR APPLICATION SOFTWARE IN FACTORY PACKAGED HVAC," filed Nov. 11, 2016, which are each hereby incorporated by reference.

BACKGROUND

The present disclosure relates generally to heating, ventilating, and air conditioning systems. A wide range of applications exist for heating, ventilating, and air conditioning (HVAC) systems. For example, residential, light commercial, commercial, and industrial systems are used to control temperatures and air quality in residences and buildings. Such systems often are dedicated to either heating or cooling, although systems are common that perform both of these functions. Very generally, these systems operate by implementing a thermal cycle in which fluids are heated and cooled to provide the desired temperature in a controlled space, typically the inside of a residence or building. Similar systems are used for vehicle heating and cooling, and as well as for general refrigeration.

HVAC units, which are included in HVAC systems, generally operate based on a sequence of operation. In some cases, a person may wish to customize the sequence of operation. However, customization of the sequence of operation typically occurs after an HVAC unit has already been delivered and installed at a particular location (e.g., a building to be heated and/or cooled by the HVAC unit).

SUMMARY

The present disclosure relates to a heating, ventilating, and air conditioning (HVAC) system that includes a non-transitory computer readable medium that includes instructions that are configured to cause a processor to generate a custom application for an HVAC unit in response to an inquiry regarding the HVAC unit. The custom application comprises a custom sequence of equipment operation of the HVAC unit, and the custom application is configured to regulate operation of components of the HVAC unit. Moreover, the custom application comprises operating parameters and control parameters associated with the HVAC unit.

The present disclosure also relates to a heating, ventilating, and air conditioning (HVAC) system that includes an inquiry and order receiving system configured to receive an inquiry and an order regarding an HVAC unit. The HVAC system also includes an inquiry and order processing system configured to process the inquiry to form a processed inquiry, wherein the inquiry and order processing system is configured to process the order. Also, the HVAC system includes a custom application database that includes data associated with a plurality of previously-processed inquiries. Furthermore, the HVAC system includes a processed inquiry and order analysis system configured to determine whether the processed inquiry matches one of the plurality of previously-processed inquiries, determine whether the processed inquiry is feasible in response to determining that the processed inquiry does not correspond to one of the plurality or previously-processed inquiries, and generate a custom application based on the processed inquiry, wherein the custom application comprises a plurality of operating parameters and control parameters associated with the HVAC unit.

The present disclosure further relates to a non-transitory computer readable medium that includes instructions configured to cause a processor to operate a heating, ventilating, and air conditioning (HVAC) system. The HVAC system is configured to receive an inquiry, wherein the inquiry is associated with operating parameters or control parameters of an HVAC unit. The HVAC system is also configured to determine whether the HVAC unit that includes the operating parameters or control parameters can be supplied and generate a custom application if the HVAC unit that includes the operating parameters or control parameters can be supplied. The custom application includes the operating parameters or the control parameters, and the custom application is configured to control the HVAC unit.

DRAWINGS

DETAILED DESCRIPTION

The present disclosure is generally directed to heating, ventilating, and air conditioning (HVAC) systems. More specifically, the present disclosure is directed to an HVAC customization system that can provide a custom operation in response to an inquiry regarding a custom HVAC unit. Typically, HVAC systems include an HVAC unit that can be controlled by a control device, and the control device includes an application (e.g., software) that enables the control device to control the HVAC unit. In some cases, it may be desirable to use an application that includes a custom sequence of operation. That is, it may be desired to control an HVAC unit in a manner that differs from a typical manner. As described herein, the present disclosure relates to an HVAC customization system that can generate custom applications (which may include a custom sequence of operation) based on inquiries and orders for custom HVAC units or custom sequences of operations.

Figure 1:
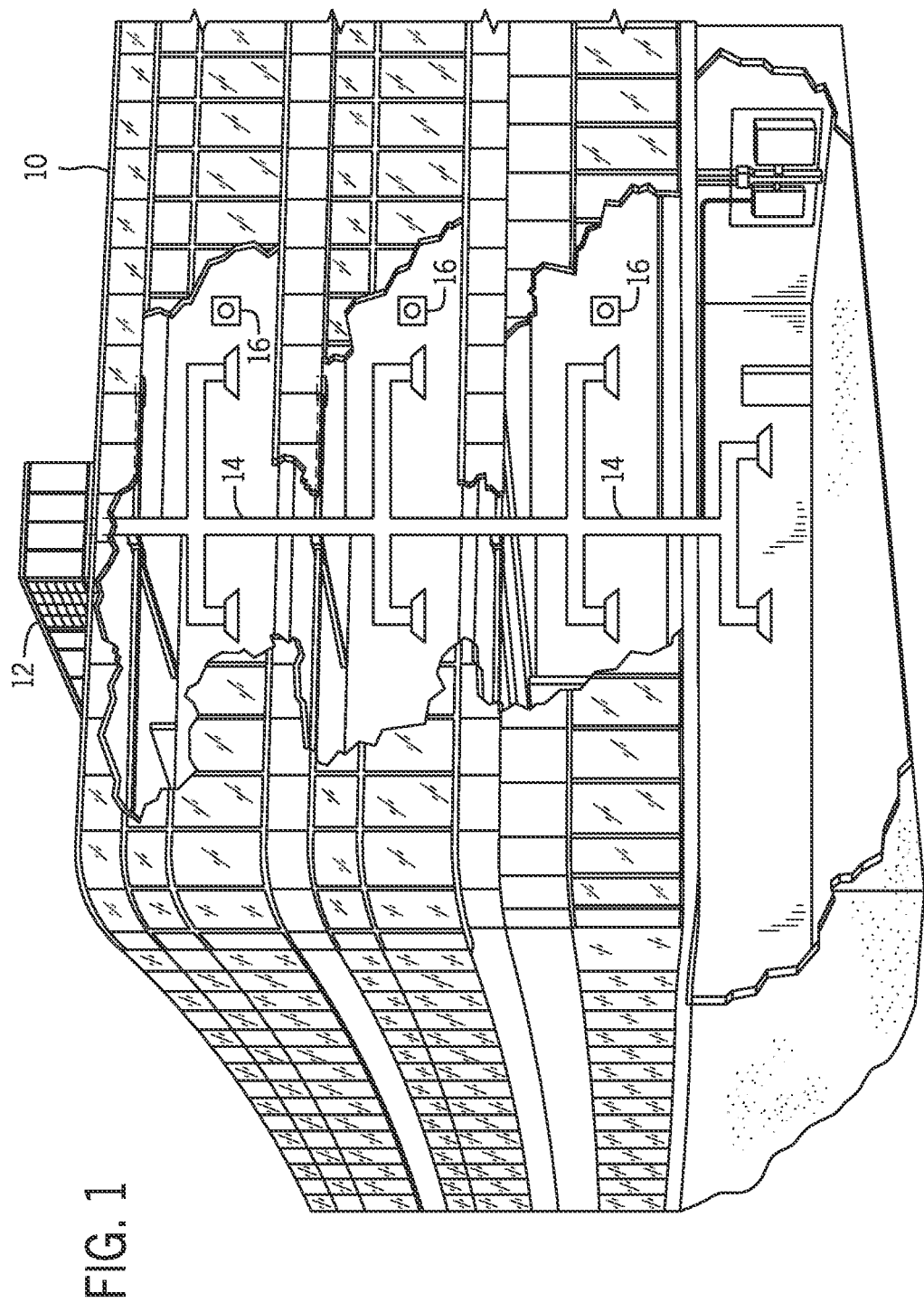
FIG. 1 is a perspective view a heating, ventilating, and air conditioning (HVAC) system for building environmental management, in accordance with embodiments described herein.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
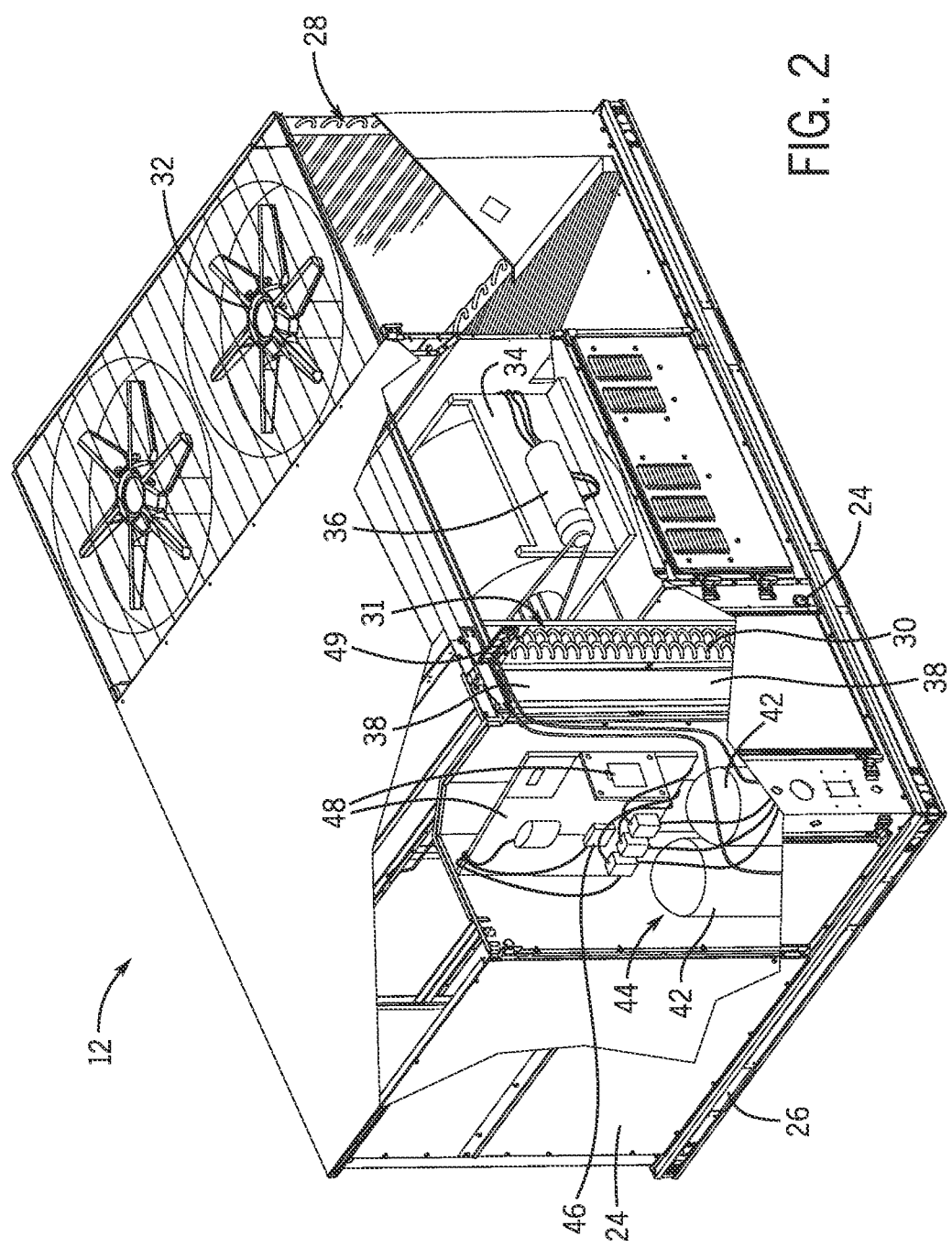
FIG. 2 is a perspective view of the HVAC unit of FIG. 1, in accordance with embodiments described herein.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
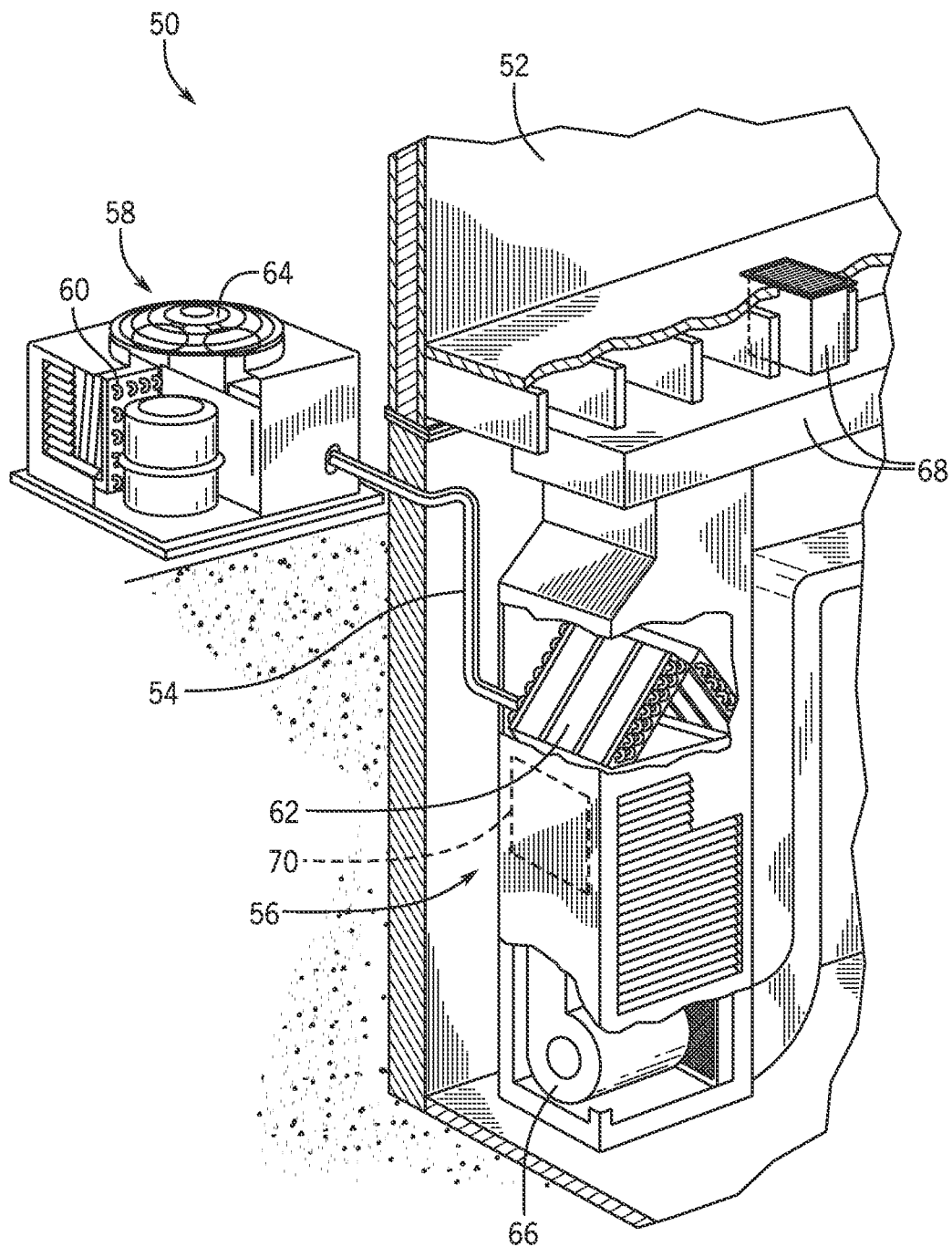
FIG. 3 is a perspective view of a residential heating and cooling system, in accordance with embodiments described herein.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
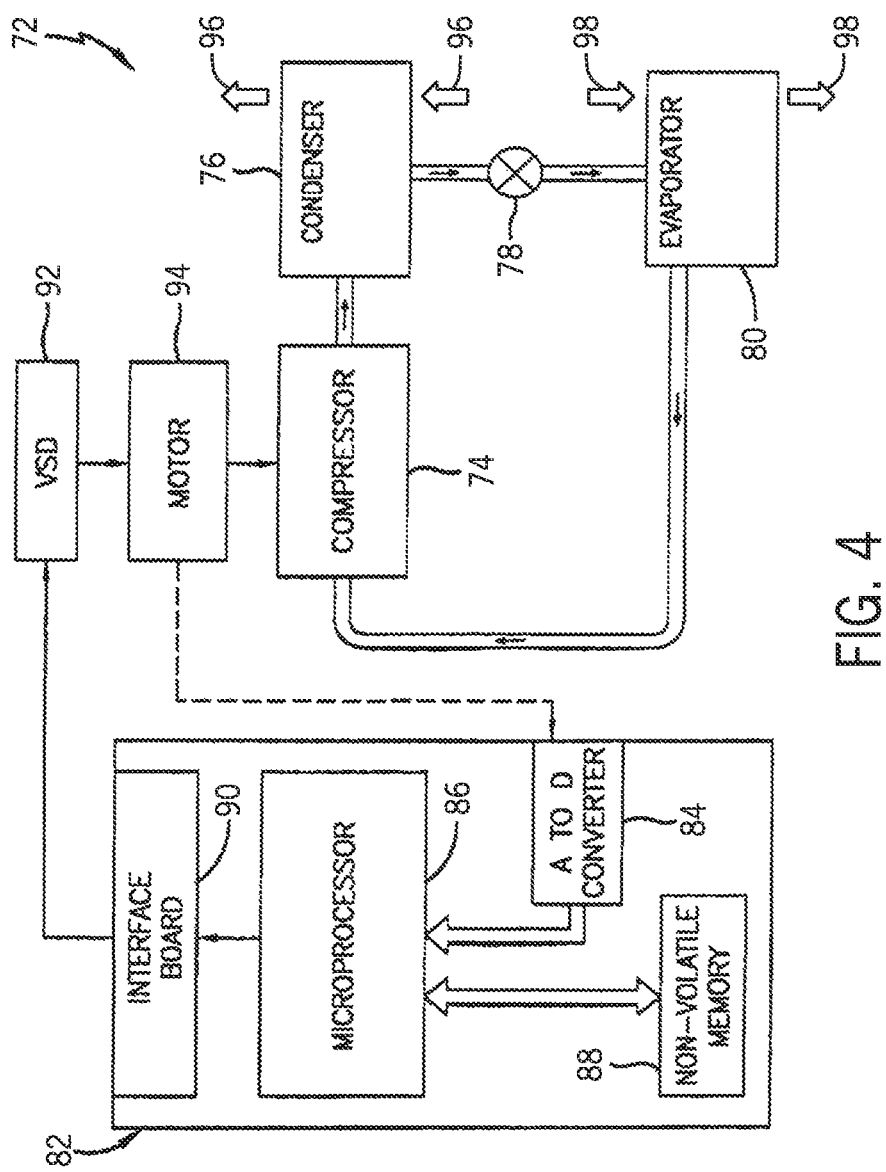
FIG. 4 is a schematic diagram of a vapor compression system that may be used in the HVAC system of FIG. 1 and the residential heating and cooling system FIG. 3, in accordance with embodiments described herein.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed above, HVAC systems may include control devices 16, such as thermostats, that can be used to regulate operation of components of HVAC units 12, the building 10, and/or the ductwork 14. For instance, the control device 16 may cause a certain sequence of operation to be implemented in various situations. For example, the control device 16 may send a signal to the HVAC unit 12 to cool the building 10, and the signal may cause components of the HVAC unit 12 to operate in a specific manner so that cooling is achieved. As a more specific yet still general example, and not necessarily in the order described, a sequence of operation could include the control device 16 sending a signal for cooling, actuating compressors 42 to cause refrigerant to run through the heat exchanger 28, actuating the fans 32 to draw in environmental air, actuating the motor 36 to cause the blower assembly 34 to draw air through the heat exchanger 30, and sending the cooled air through the ductwork 14. Of course, specific operating settings or parameters are involved with each particular operation in a sequence of operations (e.g., amount of refrigerant to used, speed at which the fans 32 and motor 36 should operate, and the like).

HVAC units, such as HVAC unit 12, as well as components of HVAC systems (e.g., control device 16) are typically either packaged HVAC units or custom HVAC units. "Packaged" refers to HVAC units that have standard functions and features when supplied to users. For example, a packaged HVAC unit may be a standard model that can be controlled by a control device that has fixed application firmware to control the HVAC unit. "Custom" refers to HVAC units that have functions and/or features that deviate from a packaged unit. For example, a custom HVAC unit could be an HVAC unit that can operate using a sequence of operation that differs from that of a packaged HVAC unit. In other words, a custom HVAC unit may be the same as a packaged HVAC unit except that that HVAC unit can be operated using a sequence of operation that is different from the sequence of operation typically provided with the packaged HVAC unit.

Typically, if a user desires an HVAC unit that can implement a sequence of operation different from that of a packaged HVAC unit, the user may reprogram a control device that controls the packaged HVAC unit. Alternatively, the user can make a custom order. That is, the user may order a unit that has a custom sequence of operation. For instance, the user could inquire whether a desired sequence of operation can be provided by a supplier of HVAC units, and if the custom sequence of operation can be provided, the user could order a custom HVAC unit that has the desired sequence of operation. The present disclosure describes techniques that relate to inquiries for custom orders and custom orders themselves.

Figure 5:
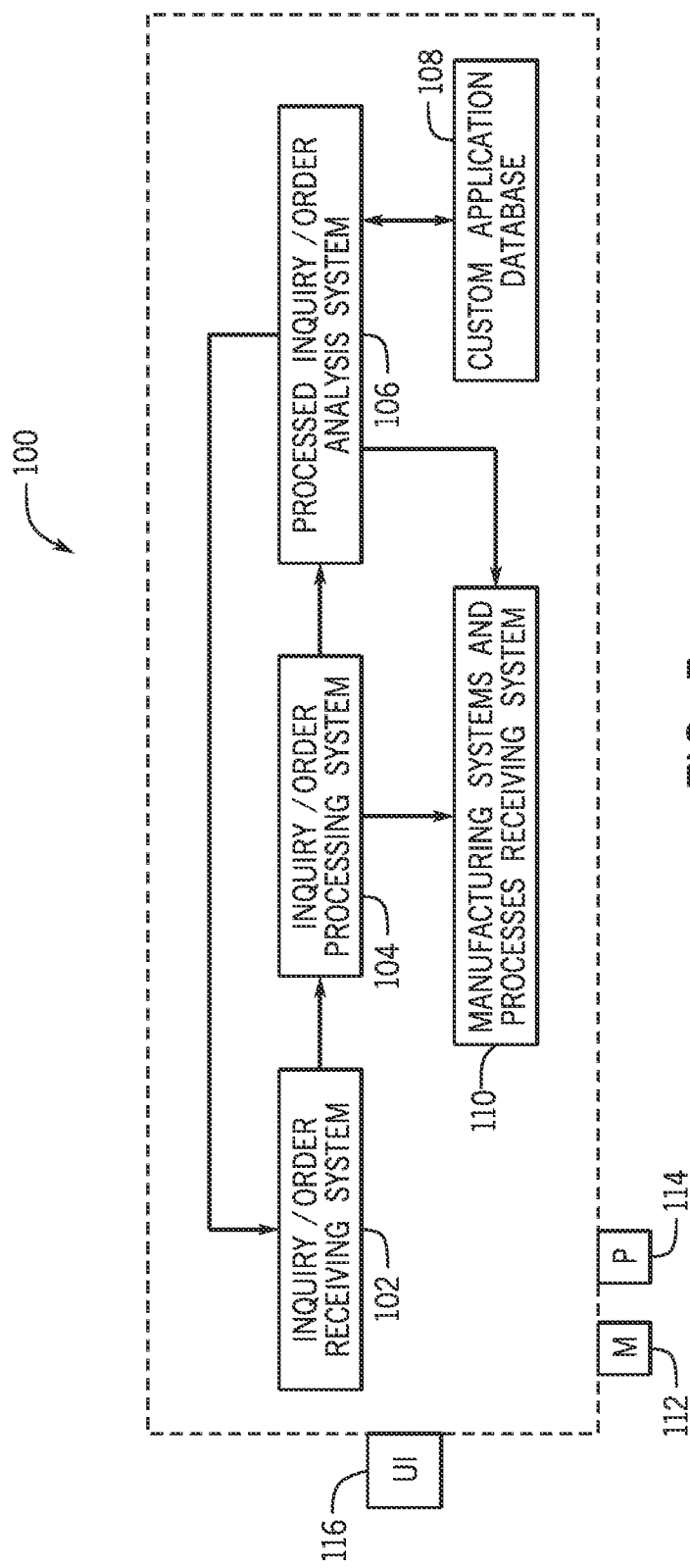
FIG. 5 is a block diagram of an HVAC customization system, in accordance with embodiments described herein.

With the foregoing in mind, it may be useful to describe an HVAC customization system that may incorporate the techniques described herein. Accordingly, FIG. 5 is a schematic diagram of an HVAC customization system 100 suitable for enabling a variety of processes related to custom HVAC units and/or components associated with HVAC units (e.g., HVAC unit 12), such as control devices (e.g., control device 16). Among other things, and as discussed below, the HVAC customization system 100 may be used to receive, process, and analyze inquiries and orders regarding custom HVAC units. It should be appreciated that the description of FIG. 5 is intended to provide an overview of the HVAC customization system 100. The discussion accompanying FIG. 6 and FIG. 7 describes the HVAC customization 100 in more detail regarding inquiries and orders.

The illustrated embodiment of the HVAC customization system 100 includes an inquiry and order receiving system 102, an inquiry and order processing system 104, a processed inquiry and order analysis system 106, a custom application database 108, and manufacturing systems and processes receiving system 110. The inquiry and order receiving system 102 receives inquiries and orders. For example, an inquiry regarding whether certain operating and/or control parameters can be provided in the HVAC unit, such as HVAC unit 12, may be made, and the inquiry and order receiving system 102 may receive such inquiries. Similarly, as discussed below, the inquiry and order receiving system 102 may receive orders. The inquiry and order processing system 104 may receive inquiries and orders from the inquiry and order receiving system 102 and process the inquiries and orders. Inquiries that have been processed are hereinafter referred to as "processed inquiries."

Processed inquiries and order may be sent to the processed inquiry and order analysis system 106, which may analyze the processed inquiries and orders. For example, as discussed below in greater detail, the processed inquiry and order analysis system 106 may determine whether an inquiry is feasible. In other words, the processed inquiry and order analysis system 106 can determine whether an HVAC unit that performs in accordance with an inquiry can be provided. Moreover, the processed inquiry and order analysis system 106 can generate control applications that provide custom operating parameters and/or control parameters for HVAC units. As discussed herein, operating parameters include parameters that relate to operating settings of HVAC units. For example, operating parameters include fan speeds, air intake, furnace settings, and the like. Control parameters are settings that pertain to the control of HVAC units. For instance, control parameters may include timings associated with the activation and deactivation of components of an HVAC unit and settings related to control actions implemented based on sensor input.

The custom application database 108 is a database, such as an electronic library or electronic database, that includes information regarding physical characteristics, operating parameters, and control parameters of HVAC units. For example, the custom application database 108 may include data regarding custom applications as well as sequences of operation. Additionally, as discussed below in more depth, the processed inquiry and order analysis system 106 may utilize and reference the custom application database 108.

The manufacturing systems and processes receiving system 110 pertains to the construction of HVAC units, as well as the installation of control applications and sequences of operation into control devices (e.g., control device 16). For example, the manufacturing systems and processes receiving system 110 may receive data from the other components of the HVAC customization system 100. For instance, the manufacturing systems and processes receiving system 110 may receive data the inquiry and order processing system 104 and the processed inquiry and order analysis system 106.

While the illustrated embodiment shows the various components of the HVAC customization system 100 as separate, in other embodiments, several of these components may be combined. For instance, in another embodiment, the inquiry and order receiving system 102 and the inquiry and order processing system 104 may be one system. As another example, the custom application database 108 may be included in the processed inquiry and order processing system 106.

Moreover, the HVAC customization system 100 described and illustrated herein corresponds to instructions stored on memory 112 (e.g., a non-transitory computer readable medium) that can be implemented by a processor 114. It should be noted several processors 114 may be used in the implementation of the HVAC customization system 100. Additionally, the HVAC customization system 100 may include a user interface 116, such as a graphical user interface, which a user may use to monitor and/or modify the operation of the HVAC customization system 100. Likewise, determinations made by the HVAC customization system 100 may be displayed on the user interface 116.

Additionally, each of the illustrated components of the HVAC customization system 100 may correspond to physical components (e.g., computers systems, servers, and/or networks) that may each include memory and processors and perform the operations associated with the components. For example, the inquiry and order receiving system 102 may be associated with a server, and the order receiving system 102 may send the received orders to a computer or another server that includes the inquiry and order processing system 104 (e.g., via the internet, a cloud, or another communication technique). Furthermore, one or more of the components of the HVAC customization system 100 may be implemented using the same hardware. For instance, one or more (e.g., all) of the inquiry and order receiving system 102, inquiry and order processing system 104, processed inquiry and order analysis system 106, custom application database 108, and manufacturing systems and processes receiving system 110 may be stored and/or implemented by the same physical components, such as the memory 112 and the processor 114.

Figure 6:
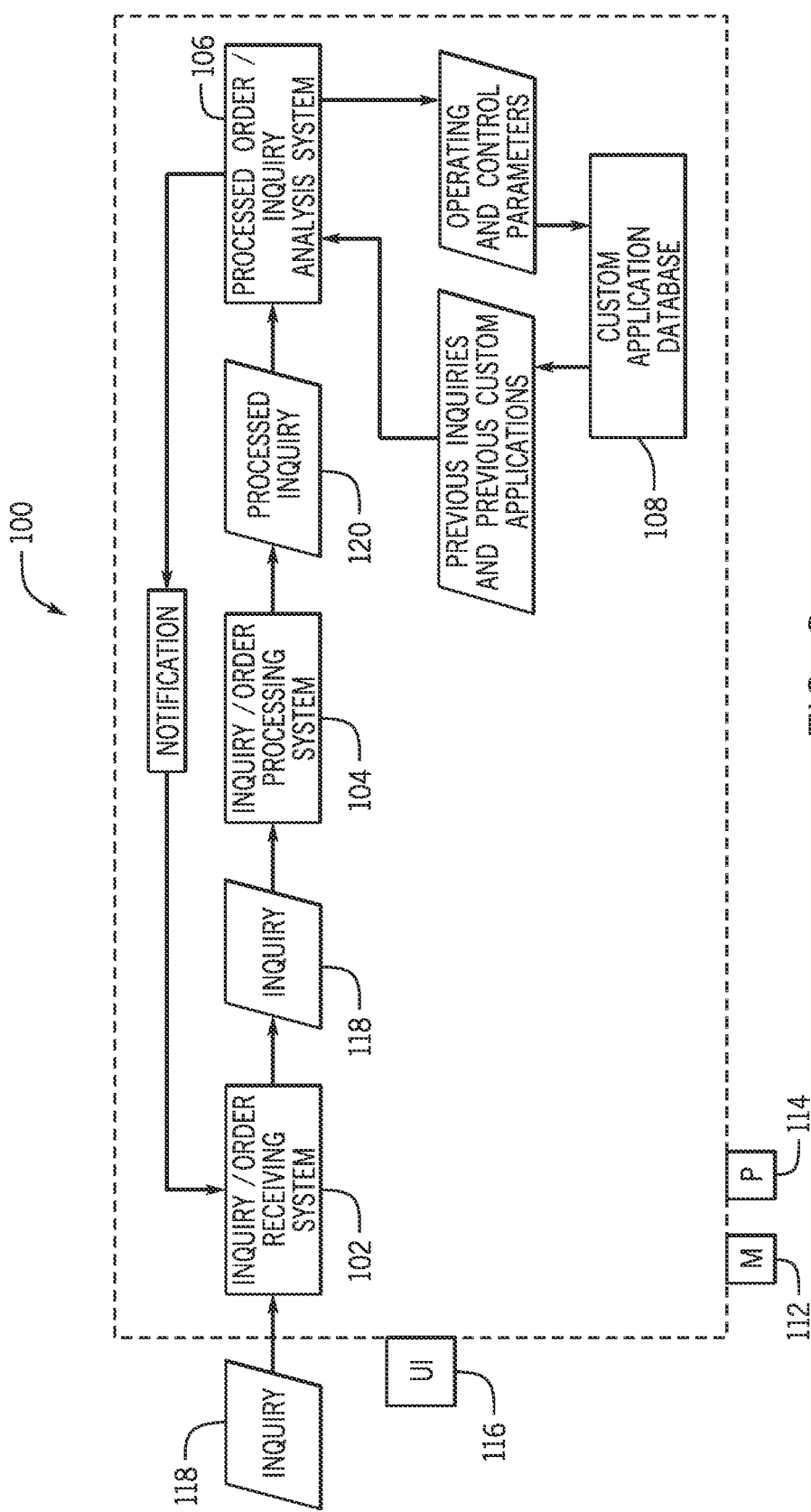
FIG. 6 is a block diagram of a portion of the HVAC customization system of FIG. 5, in accordance with embodiments described herein.

Keeping the discussion of FIG. 5 in mind, FIG. 6 is a block diagram of a portion of the HVAC customization system 100, as the HVAC customization system 100 relates to inquiries. Indeed, in order to more clearly illustrate aspects of the HVAC customization system 100, the manufacturing systems and processes receiving system 110 are not shown in FIG. 6. Additionally, FIG. 6 includes block diagrams of data that may be generated by various components of the HVAC customization system 100. Furthermore, while some of the discussion accompanying FIG. 6 discusses orders, orders are discussed in greater detail with regard to FIG. 7.

As mentioned above and shown in FIG. 6, the HVAC customization system 100 includes the inquiry and order receiving system 102. The inquiry and order receiving system 102 receives inquiries and orders regarding custom HVAC units. For instance, a potential user of a custom HVAC unit may send an inquiry 118 (e.g., via a paper, a digital form, an email, and the like) to ascertain whether an HVAC unit can be customized to meet the potential user's desired functionalities and/or sequence of operation. Similarly, the inquiry and order receiving system 102 may receive orders for custom HVAC units. Additionally, it should also be noted that the inquiry and order receiving system 102 is not limited to receiving inquiries and orders regarding custom HVAC equipment. That is, the inquiry and order receiving system 102 may also receive inquiries and orders related to packaged HVAC units.

The inquiry and order receiving system 102 sends received inquiries, such as inquiry 118, and orders to the inquiry and order processing system 104, which processes inquires and orders. For instance, the inquiry and order processing system 104 may convert received inquiries and orders into a standard format that is utilized by other components of the HVAC customization system 100. For example, and as mentioned above, inquiries and orders may be received in different formats, such as a paper order form, online order form, email, etc., and the inquiry and order processing system 104 produces the information from the inquiries and orders in a standard format, such as a file containing information from a particular inquiry or order. More specifically, an inquiry or order may include information regarding various operating parameters of a custom HVAC unit. Examples of such operating parameters include fan settings, refrigeration settings, air blower settings, and settings of other components of HVAC units such as those discussed above in relation to FIG. 2. The inquiry and order processing system 104 may process such information to generate processed inquiries, such as processed inquiry 120, and processed orders. That is, processed inquiries and orders may be files generated by the inquiry and order processing system 104 that include information regarding the inquiries and orders, such as settings associated with components of the an HVAC unit. As discussed below, the inquiry and order processing system 104 performs several other actions specifically related to orders.

The inquiry and order processing system 104 may send processed inquiries and orders to a processed inquiry and order analysis system 106. Among other things, the processed inquiry and order analysis system 106 evaluates whether settings or features in inquiries can be provided to the potential custom HVAC unit user. For example, and as discussed below, the processed inquiry and order analysis system 106 can determine whether a processed inquiry is the same as a prior or previously-processed inquiry that is stored in a custom application database 108 or how similar a processed inquiry is to a previously-processed inquiry stored in the custom application database 108.

Before discussing the processed inquiry and order analysis system 106 in greater detail, the custom application database 108 will now be discussed. The custom application database 108 stores data regarding custom HVAC systems and units. For example, the custom application database 108 may include data concerning previously manufactured and programmed custom HVAC units and/or components thereof as well as packaged HVAC units and/or components thereof. The custom application database 108 may also include data regarding sequences of operation and/or control logic or software previously developed, such as sequences of operation and/or control logic or software included in packaged or custom HVAC units. As elaborated upon in more detail below, the data in the custom application database 108 may pertain to models of HVAC units, such as HVAC unit 12, as well as components of HVAC units. Additionally, in some embodiments, the custom application database 108 may be included within the processed inquiry and order analysis system 106.

Keeping the discussion of the custom application database 108 in mind, the processed inquiry and order analysis system 106 may compare data associated with processed inquiries 120 to the data stored in the custom application database 108 as well as other data to determine whether the processed inquiry 120 pertains to desired functions or features particular to certain components of HVAC units. For example, the processed inquiry 120 includes information regarding specific operating and/or control parameters that a potential user desires of an HVAC unit, such as fans speeds, a custom sequence of operation, or ambient air intake flow rate. The processed inquiry 120, which includes such data in a standard format, may also include data tags specific to various operations or components of an HVAC unit. For example, the processed inquiry 120 may include data regarding refrigeration and/or coolant settings, and a data tag indicating that the data pertains to refrigeration may be associated with such data. In other words, data tags may indicate that the data is associated with a particular type of operating parameter and/or control parameter. As another example, the processed inquiry 120 may also include data regarding operating parameters of a fan, such as fan 32, and the data may include a data tag indicating that the data is associated with the fan. Furthermore, the data of the processed inquiry 120 may also include one or more data tags indicating whether the data is the same as data related to a packaged unit. For example, a processed inquiry 120 may call for different operating settings of a fan, but may also call for operating parameters of another component, such as heat exchanger 28, that are the same as a packaged unit.

The processed inquiry and order analysis system 106 may compare data of the processed inquiry 120 to data stored in the custom application database 108 to determine whether a processed inquiry 120 is the same as a previously processed inquiry. That is, the processed inquiry and order analysis system 106 may determine whether the processed inquiry 120 matches a custom HVAC unit, the data of which is stored in the custom application database 108. For example, the processed inquiry and order analysis system 106 may compare the data of the processed inquiry 120 to previous inquiries that are stored in the custom application database 108 and may then determine whether the processed inquiry 120 matches a previous inquiry. In response to finding a match (i.e., determining the processed inquiry 120 is the same as a previous inquiry), the processed inquiry and order analysis system 106 may send a notification to the user that submitted the inquiry to the inquiry and order processing system 102.

However, if a match is not determined to exist, the processed inquiry and order analysis system 106 may determine whether the configuration and/or settings specified in the processed inquiry (e.g., certain HVAC unit operating parameters and/or control parameters) are feasible. That is, the processed inquiry and order analysis system 106 can determine whether the characteristics requested in the inquiry 116 can be fulfilled. As discussed below, the processed inquiry and order analysis system 106 may make such a determination based on several other determinations.

First, the processed inquiry and order analysis system 106 may determine whether the processed inquiry 120 calls for any physical or control aspects of an HVAC system that cannot be provided. For example, the processed inquiry 120 may call for an operating setting, such as a fan speed, that is not physically or mechanically possible. As another example, the memory associated with the processed inquiry and order analysis system 106 may include data associated with certain components or features that are designated as being unmodifiable. The processed inquiry and order analysis system 106 may determine whether the processed inquiry 120 calls for the modification of something that has been deemed unmodifiable. For example, the processed inquiry and order analysis system 106 may determine the aspects of the processed inquiry 120 that are custom (i.e., that differ from a packaged unit), and utilize the data tags associated with the data corresponding to the aspects of the processed inquiry 120 that are custom to determine whether the processed inquiry 120 entails modifying an unmodifiable aspect. For instance, the operating and/or control parameters associated with distributing refrigerant may be enumerated as unmodifiable in memory associated with the processed inquiry and order analysis system 106, and the processed inquiry and order analysis system 106 may determine whether the processed inquiry 120 calls for modifying the operating and/or control parameters associated with distributing refrigerant. If the processed inquiry and order analysis system 106 determines that the processed inquiry 120 calls for modifying a characteristic (e.g., an operating or control parameter) that is stored as unmodifiable, the processed inquiry and order analysis system 106 will determine that the processed inquiry 120 is unfeasible and may send a notification to indicate such a determination. For example, such a notification may be sent to the inquiry and order receiving system 102.

However, if the processed inquiry and order analysis system 106 determines that the processed inquiry 120 does not call for the modification of a characteristic that has been deemed unmodifiable, the processed inquiry and order analysis system 106 continues to determine whether the processed inquiry 120 is feasible by determining whether one or more correspondence thresholds are satisfied. A correspondence threshold refers to a correlation of the processed inquiry 120 and/or characteristics of the processed inquiry 120 to inquiries stored in the custom application database 108. For example, the processed inquiry and order analysis system 106 may determine how similar that which is called for by the processed inquiry 120 is to data pertaining to each inquiry and HVAC unit saved in the custom application database 108. For such a determination a correlation coefficient (e.g., 0.99 corresponds to a 99% similarity) may be generated. The correlation coefficient may be compared to a correspondence threshold such as a predetermined minimum correlation coefficient. If the processed inquiry and order analysis system 106 determines that the correlation coefficient is equal to or greater than the correspondence threshold, the processed inquiry 120 may be categorized as feasible.

Similarly, multiple correspondence thresholds may be utilized by the processed inquiry and order analysis system 106. For example, there may be a correspondence threshold that pertains to a correlation coefficient regarding the overall similarity of the processed inquiry 120 to an inquiry stored in the custom application database 108. There may also be one or more other correspondence thresholds pertaining to specific characteristics, such as operating parameters, control parameters, physical dimensions, and the like, that are associated with respective correlation coefficients. Each of the correspondence thresholds may be equivalent, or the correspondence thresholds can be different. For example, an overall correspondence threshold may be one value (e.g., 0.90), while correspondence thresholds pertaining to fan operating settings and physical dimensions of a fan may differ from the overall correspondence value (e.g., 0.85 and 0.95) or be the same (e.g., 0.90 and 0.90). In the event the processed inquiry and order analysis system 106 determines that each of the correspondence thresholds is met, the processed inquiry 120 may be determined to be feasible by the processed inquiry and order analysis system 106.

However, in some embodiments, when each correspondence threshold is satisfied, the processed inquiry and order analysis system 106 may determine whether an HVAC may operate in accordance with the parameters of the processed inquiry 120 by performing simulations. For instance, the processed inquiry 120 may reflect certain operating parameters and/or a particular sequence of operation, and the processed inquiry and order analysis system 106 may perform simulations to ascertain whether operating an HVAC unit with operating parameters and/or a given sequence of operation will function properly. That is, the processed inquiry and order analysis system 106 may determine how the operating parameters and custom control parameters of the processed inquiry 120 can be implemented in an HVAC unit by simulating the operation of an HVAC unit with such settings. For example, the processed inquiry 120 may call for a custom control that allows for greater air intake compared to standard settings. The processed inquiry and order analysis system 106 may run simulations of an HVAC unit, such as HVAC unit 12, with various settings. For instance, the processed inquiry and order analysis system 106 may run simulations with air intake fans operating at different speeds and/or by altering the physical dimensions of the fans and determine whether such operation is feasible and/or acceptable.

The processed inquiry and order analysis system 106 may determine operating parameters and/or control parameters associated with the processed inquiry 120 from running the simulations. In other words, the processed inquiry and order analysis system 106 may run simulations of an HVAC unit, with each simulation varying one or more parameters of the HVAC unit. As a simulation is performed, the processed inquiry and order analysis system 106 may monitor various characteristics associated with the simulated HVAC unit to determine whether the simulated HVAC unit complies with the processed inquiry 120.

The simulations may include simulation settings that limit the amount of simulations performed. For instance, while it may be possible to simulate every possible combination of HVAC component modifications, operating parameters, and control parameters, simulation settings may be implemented to limit the number of possible combinations. For instance, one simulation setting may limit the range of an operating parameter to be simulated (e.g., fan speed or fan size), thereby reducing the amount of simulations that may be performed by the processed inquiry and order analysis system 106. There may be many simulation settings. In certain embodiments, the more settings in place, the fewer simulations that will be run. In any event, the data from the simulations (e.g., potential operating parameters, control parameters, and/or other data regarding HVAC units) may be stored in the custom application database 108. Also, as mentioned below, the inquiry 118 and processed inquiry 120 may be stored in the custom application database 108.

If the processed inquiry and order analysis system 106 determines that a simulation of an HVAC unit with various characteristics (e.g., specific components and control settings) is indicative of an HVAC unit that will comply with the processed inquiry 120, the processed inquiry and order analysis system 106 will determine that the processed inquiry 120 is feasible. In other words, the processed inquiry and order analysis system may determine that a processed inquiry is feasible if the processed inquiry corresponds to operating parameters and control parameters that, when simulated, cause an HVAC unit to operate in a manner that is both physically possible and in accordance with the processed inquiry. However, if no simulation results in a functioning HVAC unit that operates in accordance with the processed inquiry 120, than the processed inquiry and order analysis system 106 will determine that the processed inquiry 120 is unfeasible.

A notification regarding a determination of whether the inquiry 118 is feasible (e.g., based on analysis of the processed inquiry 120 by the processed inquiry and order analysis system 106) may be sent by the processed inquiry and order analysis system 106. For example, an email may be generated and sent indicating whether the processed inquiry 120 is feasible or not. In the event the processed inquiry 120 is feasible, an order for a custom HVAC unit that satisfies the specifications of the processed inquiry 120 may be placed.

Figure 7:
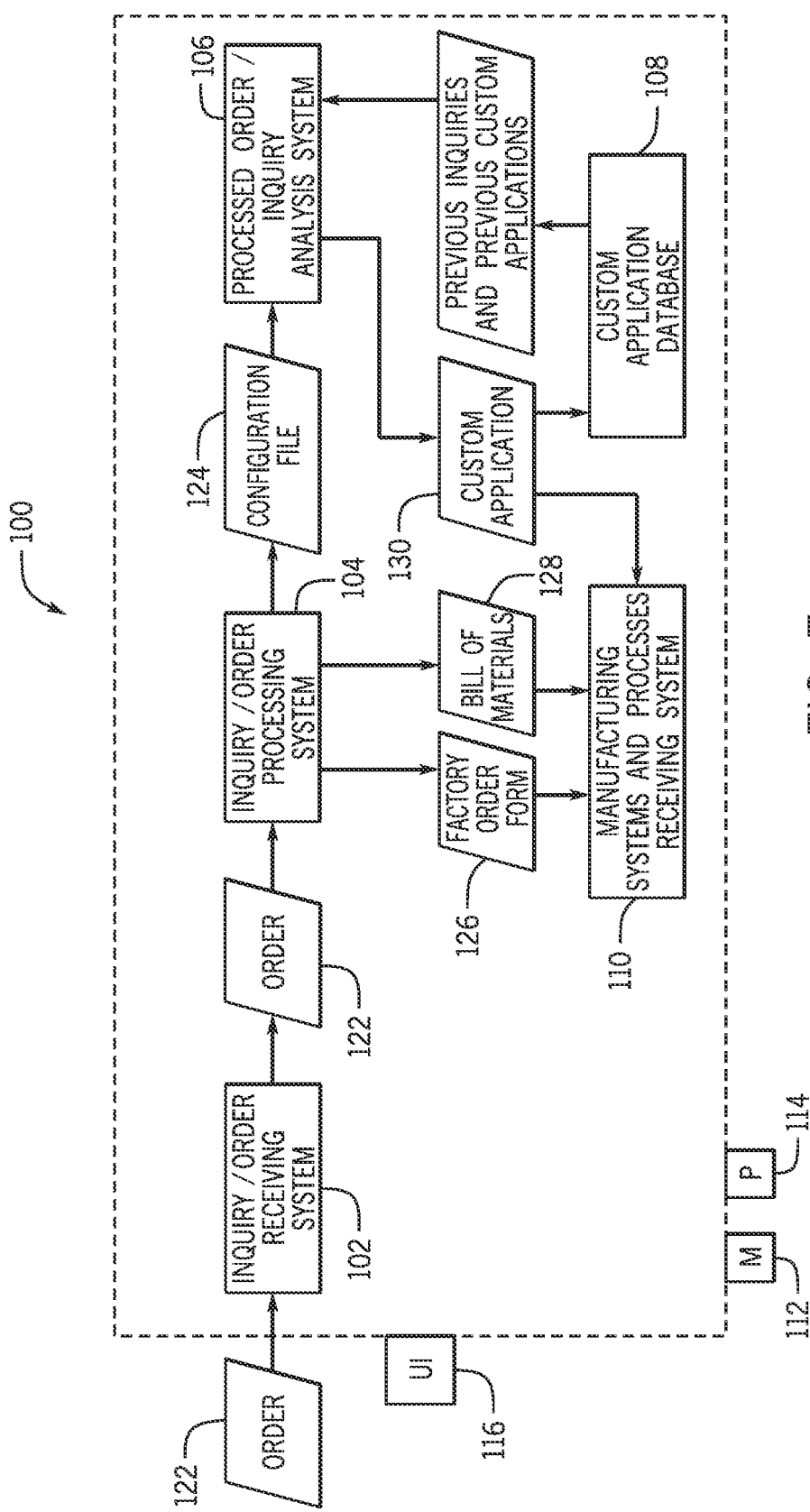
FIG. 7 is a block diagram of the HVAC customization system of FIG. 5, in accordance with embodiments described herein.

Keeping the discussion of FIG. 5 and FIG. 6 in mind, FIG. 7 is a block diagram of the HVAC customization system 100 as the HVAC customization pertains to orders. Similar to FIG. 6, FIG. 7 includes several blocks representative of data that may be generated and communicated by components of the HVAC customization system 100. As described above, the inquiry and order receiving system 102 may receive an order, such as order 122. That is, the inquiry and order receiving system 102 may receive an order for an HVAC unit that corresponds to a processed inquiry, such as processed inquiry 120.

Furthermore, the inquiry and order receiving system 102 may send received orders 122 to the inquiry and order processing system 104, which, as described above, processes orders. For example, the inquiry and order processing system 104 may convert orders into a standard format and/or file type. Additionally, the inquiry and order processing system 104 may determine whether an order corresponds to a processed inquiry. For example, a processed inquiry may include an identifier, such as an inquiry number, and the order 122 may include the same identifier or another identifier that corresponds to the identifier associated with the processed inquiry 120, and the inquiry and order processing system 104 may determine that the order 122 is associated with the processed inquiry 120 based on the identifier(s).

As part of processing an order, the inquiry and order processing system 104 may generate a configuration file 124 that can be utilized by the processed inquiry and order analysis system 106. The configuration file 124 may include data regarding operating parameters, control settings, and/or physical characteristics, such as dimensions, sizes, component types, and the like, that pertain to the order 122. For example, if the order 122 corresponds to a processed inquiry that was determined to be feasible after the processed inquiry and order analysis system 106 performed simulations, the configuration file 124 may include data regarding the simulated HVAC unit, operating settings or parameters pertaining to the simulated HVAC unit, and control settings (e.g., a sequence of operation) associated with the simulated HVAC unit.

Additionally, while processing the order 122, the inquiry and order processing system 104 may generate a factory order form 126 as well as a bill of materials 128, both of which may be sent to manufacturing systems and processes receiving system 110. The factory order form 126 may be a file generated that includes various information regarding the order 122, such as a model of HVAC unit, information regarding the person or entity that placed the order 122, and the like. The bill of materials 128 is a file that includes information regarding the HVAC unit to be built. More specifically, the bill of materials 128 may include a list of all of the physical components to be utilized to build an HVAC unit to satisfy the order 122, such as motors, heat exchangers, controllers, fans, panels, screws, bolts, and the like. In embodiments in which the order 122 is associated with a processed inquiry that was determined to be feasible by at least partially utilizing simulations, the bill of materials 128 may be generated based on the simulations.

The inquiry and order processing system 104 may send the configuration file 124 to the processed inquiry and order analysis system 106, and the processed inquiry and order analysis system 106 may develop a custom application 130, which may include a sequence of operation, that can be used to fulfill the order. That is, the processed inquiry and order analysis system 106 may determine control and operating parameters with which an HVAC unit to be produced can be operated to comply with the order 122. In many cases, the processed inquiry and analysis system 106 may have already generated several potential options while simulating whether the processed inquiry 120 associated with the order 122 was feasible. For example, the processed inquiry and order analysis system 106 may have determined one or more sets of operating parameters and control parameters that, based on the conducted simulations, would cause the an HVAC unit to fulfill a processed inquiry with which the order 122 is associated. The processed inquiry and order analysis system 106 may run further simulations to refine the operating parameters and control parameters generated during the earlier simulations. In other words, the processed inquiry and order analysis system 106 may perform simulations in addition to those performed when determining whether the processed inquiry 120 that corresponds to the order 122 was feasible, and such additional simulation may be used to refine operating parameters and control parameters that may be included in a custom application. For instance, parameters simulated previously may have been stored in the custom application database 108, and the processed inquiry and order analysis system 106 may perform more simulations based on the operating and control parameters associated with the prior simulations. In any case, based on the simulations, a custom application, such as custom application 130, specific to the order 122 will be generated by the processed inquiry and order analysis system 106. That is, the processed inquiry and order analysis system 106 generates custom operating parameters and control parameters specific to the order 122. In one embodiment, the processed inquiry and order analysis system 106 may determine the custom application 130 based on a simulation that best fulfills the order 122. For example, more than one simulation may indicate that an HVAC unit with certain operating and control settings will accord with or satisfy the order 122. The processed inquiry and order analysis system 106 may determine that one such simulation (and the operating parameters and control parameters associated with such a simulation) will cause an HVAC unit to more optimally fulfill the order 122. For example, processed inquiry and order analysis system 106 may factor in estimated power consumption, efficiency, maintenance activities, and the like in order to determine which simulation will most likely achieve what is set forth in the order 122.

Before continuing on to a discussion of the manufacturing systems and processes receiving system 110, it should be reiterated that that operating parameters and control parameters that are generated during the performance of simulations by the processed inquiry and order analysis system 106 may be stored in the custom application database 108. In other words, the custom applications 130 that are generated by the processed inquiry and order analysis system 106 may be stored in the custom application database 108. As such, future processed inquiries may be compared to, and analyzed against, operating parameters and control parameters that are generated by the processed inquiry and order analysis system 106.

The manufacturing systems and processes receiving system 110, which may be included in the HVAC customization system 100, are associated with the construction of HVAC units to be built, as well as the installation of the custom application associated with the HVAC unit. As mentioned above, the inquiry and order processing system 104 may generate the factory order form 126 and the bill of materials 128 based on the order 122 (which is associated with processed inquiry 120), and the inquiry and order processing system 104 may send the factory order form 126 and bill of materials 128 to the manufacturing systems and processes receiving system 110 so that an HVAC unit may be built to fulfill the order 122. Additionally, custom applications 130 generated by the processed inquiry and order analysis system 106 may be sent to the manufacturing systems and processes receiving system 110 for the custom application 130 to be included in a control device, such as control device 16, associated with the HVAC unit, such as HVAC unit 12.

Figure 8:
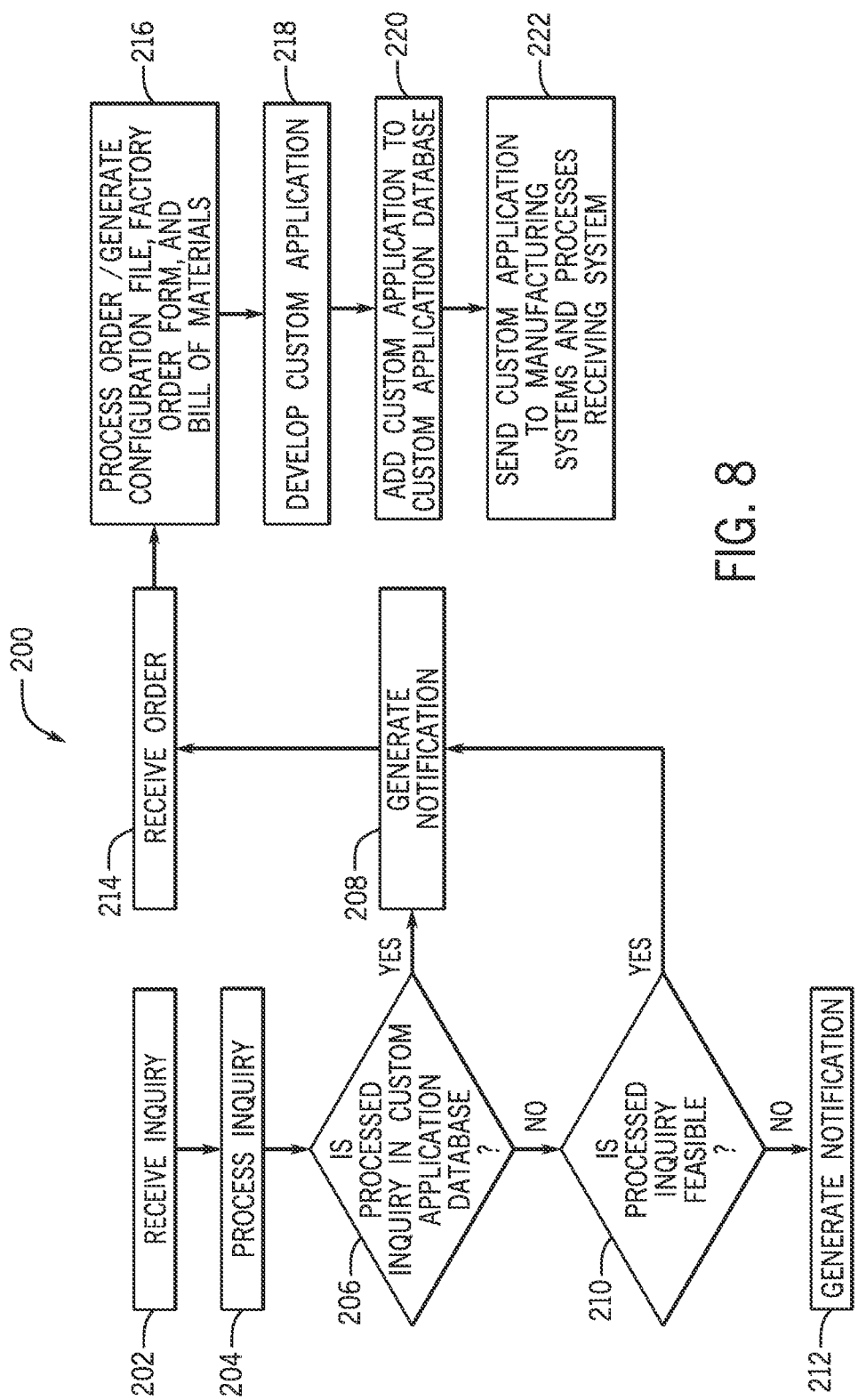
FIG. 8 is a flow chart of a method for generating a custom application, in accordance with embodiments described herein.

With the discussion of the HVAC customization system 100 in mind, FIG. 8 is a flow chart of a method 200 of generating a custom application. The method 200 may be performed by the HVAC customization 100. In other words, the method 200 may be performed by a processor, such as processor 114, that is suitable for implementing the HVAC customization system 100.

At block 202, an inquiry, such as inquiry 118, is received. For example, and as discussed above, the inquiry and order receiving system 102 may receive the inquiry 118 regarding a custom HVAC unit.

At block 204, the inquiry 118 is processed. As discussed above, the inquiry and order processing system 104 may generate the processed inquiry 120, which may be a file storing data in a standard format that corresponds to information included in the inquiry 118 received at block 202.

At block 206, the HVAC customization system 100 may determine whether the processed inquiry 120 is in the custom application database 108. As discussed above, the processed inquiry and order analysis system 106 may compare the processed inquiry 120 to prior processed inquiries, orders, HVAC units, operating parameters, and control parameters stored in the custom application database 108 to determine whether the processed inquiry 120 is in the custom application database 108. In the event the processed inquiry and order analysis system 106 determines that the processed inquiry 120 is in the custom application database 108, at block 208, a notification may be generated and be indicative that an order, such as order 122, corresponding to the processed inquiry 120 can be made.

In the event the processed inquiry and order analysis system 106 determines that the processed inquiry 120 differs from the data stored in the custom application database 108, at block 210, the processed inquiry and order analysis system 106 may determine whether the processed inquiry 120 is feasible. As discussed above, determining whether the processed inquiry 120 is feasible may include several determinations. For example, the processed inquiry and order analysis system 106 may determine whether the characteristics of the processed inquiry 120 pertain to operating and/or control parameters that are unmodifiable, whether one or more correspondence thresholds are met, and/or whether an HVAC unit can operate in accordance with operating and control parameters that correspond to the processed inquiry 120 by performing simulations. Furthermore, performing simulations can cause various operating parameters and control parameters (which correspond to a custom application) to be simulated, and the operating parameters and control parameters may be stored in the custom application database 108. In the event the processed inquiry and order analysis system 106 determines that the processed inquiry 120 is unfeasible, at block 212, the HVAC customization system 100 may generate a notification indicative that the processed inquiry 120 is unfeasible.

However, in the event the processed inquiry and order analysis system 106 determines that the processed inquiry 120 is feasible, at block 208, a notification may be generated and be indicative that an order, such as order 122, corresponding to the processed inquiry 120 can be made. Furthermore, at block 214, the order 122 that corresponds to the inquiry 118 and processed inquiry 120 may be received. For instance, the inquiry and order receiving system 102 may receive the order 122 as described above.

At block 216, the inquiry and order processing system 204 may process the order 122. As discussed above, processing the order 122 may include generating the configuration file 124, sending the configuration file 124 to the processed inquiry and order analysis system 106, generating the factory order form 126 and bill of materials 128, and sending the factory order form 126 and bill of materials 128 to the manufacturing systems and processes receiving system 110.

At block 218, a custom application, such as custom application 130, that complies with the order 122 may be generated. As described above, the custom application 130 includes operating parameters and control parameters, such as a sequence of operation, which may be generated while performing simulations of HVAC units.

At block 220, the custom application 130 may be added to the custom application database 108. As such, custom applications 130 that are generated may be used in the future in response to receiving more inquiries.

At block 222, the custom application 130 may be sent to the manufacturing systems and processes receiving system 110. The custom application 130 may also be included in a control device associated with the HVAC unit that is built to fulfill the order.

With the discussion of the HVAC customization system 100 in mind, it should be noted that utilization of the HVAC customization system 100 results in an HVAC unit with a custom application, and the HVAC unit can be tested before the HVAC unit is delivered and/or installed. For example, after the custom application 130 is implemented or programmed onto a control device associated with an HVAC unit, the HVAC unit and custom application 130 can be tested to ensure that the HVAC unit can be operating and controlled in accordance with the inquiry 118 and order 122 (i.e., perform a specific sequence of operation), and such testing can be performed before the HVAC unit is delivered to the person or entity that sent the inquiry 118 and order 122.

While only certain features and embodiments of the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described (i.e., those unrelated to the presently contemplated best mode of carrying out the present disclosure, or those unrelated to enabling the claimed embodiments). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A method, comprising:
   receiving, via one or more processors, an order for a heating, ventilating, and air conditioning (HVAC) system;
   determining, via the one or more processors, that the order does not match one of a plurality of completed orders stored in a custom software application database;
   in response to determining that the order does not match one of the plurality of completed orders, performing, via the one or more processors, a computer simulation of a simulated HVAC unit using a plurality of operating and control parameters associated with the order;
   determining, via the one or more processors, that the order is feasible based on a performance of the simulated HVAC unit with the plurality of operating and control parameters associated with the order;
   generating, via the one or more processors, a configuration file comprising the plurality of operating and control parameters in response to determining that the order is feasible; and
   generating, via the one or more processors, a custom software application based on the configuration file, wherein the custom software application, when executed, operates an HVAC unit of the HVAC system.

2. The method of claim 1, wherein generating the custom software application based on the plurality of operating and control parameters comprises generating, via the one or more processors, a custom sequence of operation of the HVAC unit for the custom software application.

3. The method of claim 1, wherein determining that the order is feasible comprises determining, via the one or more processors, that the order does not comprise an unmodifiable operating parameter or an unmodifiable control parameter.

4. The method of claim 1, wherein determining that the order is feasible comprises:

determining, via the one or more processors, a correlation coefficient indicative of a similarity between the order and the plurality of completed orders; and determining, via the one or more processors, that the correlation coefficient satisfies a predetermined correspondence threshold.

5. The method of claim 1, comprising performing, via the one or more processors, an additional computer simulation to refine the plurality of operating and control parameters before generating the configuration file.

6. The method of claim 1, wherein the plurality of completed orders comprises information regarding one or more physical characteristics, one or more operating parameters, one or more control parameters, or a combination thereof associated with a plurality of HVAC units.

7. The method of claim 1, comprising processing, via the one or more processors, the order into a standard format, wherein each completed order of the plurality of completed orders comprises the standard format.

8. The method of claim 1, comprising:
storing, via the one or more processors, the custom software application and the order with the plurality of completed orders stored in the custom software application database;
receiving, via the one or more processors, a second order for generating the custom software application for operating a second HVAC unit;
determining, via the one or more processors, that the second order matches the order in the custom software application database; and
generating, via the one or more processors, an indication that the second order matches the order.

9. The method of claim 1, comprising installing the custom software application on a control device of the HVAC unit.

10. The method of claim 1, wherein the custom software application, when executed, operates at least one of a compressor, a fan, a motor, or a blower assembly of the HVAC unit to condition an air flow directed through the HVAC unit.

11. A tangible, non-transitory, computer-readable medium, comprising instructions executable by at least one processor of an order analysis system that, when executed by the at least one processor, cause the at least one processor to:
receive an order for generating a custom software application configured to operate a heating, ventilating, and air conditioning (HVAC) unit;
determine whether the order matches one of a plurality of completed orders stored within a custom software application database communicatively coupled to the at least one processor;
in response to determining that the order does not correspond to one of the plurality of completed orders, perform a plurality of computer simulations of a computer-simulated HVAC unit, wherein each computer simulation of the plurality of computer simulations comprises computer-simulated operation of the computer-simulated HVAC unit with a different value of at least one operating parameter of the computer-simulated HVAC unit, wherein the at least one operating parameter comprises at least one of a fan speed, a fan dimension, an air intake flow rate, or a furnace setting;
determine whether the order is feasible based on a performance of the computer-simulated HVAC unit; and
generate the custom software application based on the order in response to determining that the order is feasible, wherein the custom software application comprises a plurality of operating and control parameters for operating the HVAC unit, and the custom software application, when executed, operates the HVAC unit using the plurality of operating and control parameters.

12. The tangible, non-transitory, computer-readable medium of claim 11, wherein the plurality of operating and control parameters comprises a custom sequence of operation, the air intake flow rate, the fan speed, the furnace setting, or a combination thereof.

13. The tangible, non-transitory, computer-readable medium of claim 11, wherein the instructions, when executed, cause the at least one processor to determine whether the order is feasible by analyzing unmodifiable operating parameters or unmodifiable control parameters of the order, analyzing one or more correspondence thresholds of the order, or a combination thereof.

14. The tangible, non-transitory, computer-readable medium of claim 11, wherein the order comprises a file with data in a standard format or file type, and wherein each completed order of the plurality of completed orders comprises the standard format or file type.

15. The tangible, non-transitory, computer-readable medium of claim 11, wherein the instructions, when executed by the at least one processor, cause the at least one processor to determine a fan speed setting, a fan dimension selection, an air intake flow rate setting, a furnace parameter, or a combination thereof based on the plurality of computer simulations, and wherein the plurality of operating and control parameters comprises the fan speed setting, the fan dimension selection, the air intake flow rate setting, the furnace parameter, or the combination thereof.

16. A customization system for a heating, ventilating, and air conditioning (HVAC) system, wherein the customization system comprises at least one processor configured to:
receive a custom order for generating a custom software application for operating an HVAC unit;
determine whether the custom order matches one of a plurality of completed custom orders stored in a custom software application database of the customization system;
in response to determining that the custom order does not correspond to one of the plurality of completed custom orders, perform a computer simulation of a simulated HVAC unit, wherein the simulated HVAC unit is configured to operate according to a plurality of operating and control parameters; and
generate a custom software application, wherein the custom software application, when executed, is configured to cause a control device of the HVAC unit to actuate at least one of a compressor, a fan, a motor, or a blower assembly of the HVAC unit according to the plurality of operating and control parameters.

17. The customization system of claim 16, wherein the at least one processor is configured to:
generate a configuration file comprising the plurality of operating and control parameters; and
generate the software application based on the configuration file.

18. The customization system of claim 17, wherein the custom software application is generated before the HVAC unit is delivered to an entity that provided the custom order.

19. The customization system of claim 16, wherein the plurality of operating and control parameters comprises a speed setting, a temperature setting, a pressure setting, a furnace setting, an air intake setting, or a combination thereof.

20. The customization system of claim 16, wherein the plurality of operating and control parameters comprises a timing associating with activation of a component of the HVAC unit, a timing associated with deactivation of the component, a control action to be taken in response to a sensor input, or a combination thereof.

* * * * *